United States Patent [19]

Usami et al.

[11] 3,816,337

[45] June 11, 1974

[54] PROCESS FOR PREPARING A CATALYTIC COBALT CARBONYL REACTION PRODUCT

[75] Inventors: Seiji Usami; Kotaro Nishimura, both of Saitama; Saburo Fukushi, Tokyo, all of Japan

[73] Assignee: Toa Nenryo Kogyo Kabushiki Kaisha, Tokyo, Japan

[22] Filed: July 10, 1972

[21] Appl. No.: 270,314

Related U.S. Application Data

[63] Continuation of Ser. No. 68,751, Sept. 1, 1970, abandoned, which is a continuation-in-part of Ser. No. 743,015, July 8, 1968, abandoned.

[52] U.S. Cl. .......... 252/414, 252/443, 260/604 HF, 423/417, 423/418
[51] Int. Cl. ...................... B01j 11/82, B01d 15/06
[58] Field of Search ................... 252/411, 443, 414; 423/417, 418; 260/604 HF

[56] References Cited
UNITED STATES PATENTS
2,811,567  10/1957  Mason ............................ 260/638
3,507,615  4/1970  Usami et al. ........................ 23/203

*Primary Examiner*—Daniel E. Wyman
*Assistant Examiner*—W. J. Shine
*Attorney, Agent, or Firm*—Woodhams, Blanchard & Flynn

[57] ABSTRACT

The invention relates to (1) the preparation of a catalyst comprising cobalt carbonyl in admixture with a metal substance selected from the group consisting of a metal of Groups I or II of the Periodic Table, useful as an oxo reaction catalyst by reacting the corresponding free metals or a compound thereof in a liquid medium with carbon monoxide and hydrogen in the presence of palladium, platinum or gold; (2) regenerating spent cobalt catalysts of the foregoing type by applying the same reagents and conditions to the spent catalyst.

10 Claims, No Drawings

PROCESS FOR PREPARING A CATALYTIC COBALT CARBONYL REACTION PRODUCT

CROSS REFERENCE TO RELATED APPLICATION

This application is a continuation of application Ser. No. 68,751, filed Sept. 1, 1970, now abandoned, which is in turn a continuation-in-part application of application Ser. No. 743,015, filed July 8, 1968, now abandoned.

BACKGROUND OF THE INVENTION

This invention relates to a novel method of preparing a binary catalyst composition containing cobalt carbonyl suitable particularly for catalyzing the reaction of an olefin with carbon monoxide and hydrogen at elevated temperatures and pressures. The novel catalyst is of the class known as an oxo reaction catalyst. The invention also relates to a method of making the said novel catalyst.

The novel catalyst composition comprises (1) a cobalt carbonyl compound in admixture with (2) a second metal or metal compound having the property of catalytically producing the dimerization-dehydration production of aldehydes. The novel catalyst composition is formed, itself, according to this invention by a novel catalytic reaction as will be discussed below.

The novel method of preparing the cobalt carbonyl catalyst composition of this invention, broadly stated, involves carrying out the reaction of (A) cobalt metal or a cobalt compound in the presence of (B) a second metal or metal compound capable of effecting the dimerization-dehydration reaction, with a carbon monoxide gas containing hydrogen as will be explained in detail below, in the presence of a noble metal.

The so-called oxo process, particularly the oxo dimerization-dehydration for the production of an aldehyde or an alcohol having $2(n + 1)$ carbon atoms by reacting an olefinic compound having $n$ carbon atoms with carbon monoxide and hydrogen at elevated temperatures and pressures is known in the art. Details of the process are to be found, for example, in U.S. Pat. No. 2,811,567 or Japanese Pat. Publication No. 13057/1964. The invention described herein, as previously noted, provides an improved oxo reaction catalyst for carrying out this reaction and a novel process for preparing the catalyst.

There are numerous reports in the scientific and technical literature describing the preparation of metal carbonyls, and particularly cobalt carbonyl. Examples are Journal of the American Chemical Society 73 2656 (1957); U.S. Pat. No. 2,477,353; and Japanese Pat. Publication No. 10924/1956. These prior methods for metal carbonyl preparation can be classified into, on the one hand, those non-catalyst methods using a variety of cobalt compounds and reaction media, and, on the other hand, those so-called automatic catalyst procedures in which a carbonyl such as cobalt carbonyl is previously prepared and used in the reaction as a catalyst.

These former methods of preparing metal carbonyls possess a number of technical and industrial disadvantages. They are troublesome in operation, require prolonged reaction times, high temperatures and high pressures. Moreover, and of singular industrial disadvantage in the preparation of binary catalysts, is the fact that the presence of any of the recognized dimerization-dehydration catalytic metallic agents from Group I or Group II of the Periodic Table inhibits the carbonylation reaction, and the rate of reaction is markedly decreased and the reaction time unduly prolonged. Additionally, the induction period which characterizes many prior processes aggravates the disadvantages.

The industrial production of carbonyl compounds, particularly cobalt carbonyl compounds, for satisfactory results requires that the temperature and pressure be kept as low as possible from the viewpoints of sealing problems, gas-tightness, pressure resistance and resistance to corrosion of the carbonylation apparatus. It is further obviously desirable that the reaction take place without an induction period and that the reaction ratio should be at a maximum for reasons of efficiency and cost.

The conventional prior processes for the production of carbonyl catalysts, particularly binary catalysts of the kind heretofore mentioned, have failed to provide these needs.

SUMMARY OF THE INVENTION

We have discovered that the synthesis reaction heretofore noted of making cobalt carbonyl compounds is catalyzed by a noble metal of the group consisting of palladium, platinum or gold, and moreover the reaction takes place readily in the presence of metals of Group I or Group II of the Periodic Table.

This invention hence includes as one aspect the process for preparing the improved binary catalyst composition useful in the oxo dimerization-dehydration reaction without the attendant disadvantages heretofore mentioned. In this embodiment cobalt metal or a cobalt compound is reacted with carbon monoxide and hydrogen, i.e., hydrogen-containing carbon monoxide gas, in the presence of a second metal or metal compound that is effective as a dimerization-dehydration catalyst. The reaction is carried out in the liquid phase in the presence of a noble metal selected from the group consisting of palladium, platinum and gold.

The ratio of hydrogen to carbon monoxide in the gas used in this catalyst forming reaction can be in the range of 0.05 to 2.0 mols of hydrogen per mol of carbon monoxide, preferably 0.2 to 1.5 mols of hydrogen per mol of carbon monoxide. Synthesis gas in which the hydrogen to carbon monoxide ratio is about 1.3 is quite suitable.

According to this invention, the carbonyl synthesis, unlike conventional technology such as heretofore referred to, can be carried out in one step, and the novel catalyst composition so obtained can be used directly as an oxo dimerization-dehydration catalyst, efficiently producing, for example, an aldehyde having $2(n + 1)$ carbon atoms from an olefinic feed material having $n$ carbon atoms. The catalyst when it eventually becomes spent, or any other spent oxo dimerization-dehydration cobalt carbonyl catalyst can be effectively regenerated by applying to them the above novel reaction conditions according to this invention.

The catalyst composition of this invention can be used directly in the oxo dimerization-dehydration process as catalyst, wherein a high rate of reaction is achieved and maintained without the conventional induction period, even under relatively mild reaction conditions. Thus, where side reactions and isomerization would normally interfere under the conventional aldehyde-forming conditions of high temperature in the oxo process, resulting in large quantities of undesired high boiling substances, high temperatures can be used without such disadvantages with the catalyst of this invention.

The metals of Group IA of the Periodic Table, such as lithium, sodium and potassium; and the metals of Group IIA or IIB, such as beryllium, magnesium, zinc, cadmium and strontium can be employed as the second metal component of the novel catalyst, as well as lead, vanadium or manganese. Particularly preferred are zinc or magnesium. The proportion of this second metal component compared with cobalt carbonyl is not critical, and small or catalytic amounts are effective. We prefer to use an amount of one part of said second metal to 0.5 to 5.0 parts by weight of cobalt carbonyl (as metal).

The forms of the cobalt and the second metal in the reaction mixture from which the catalyst composition is made can be selected from either the metallic form, the oxidized form or the salt form. In the latter, the salt can be any inorganic salt or organic salt, although those which are known to inhibit the action of the noble metal catalyst are to be avoided, of course. Of the metal compounds, the hydroxide or a fatty acid salt such as the oleate, naphthenate, stearate and palmitate is preferred from reactional and operational standpoints.

When using the novel process of this invention to rejuvenate spent catalysts one uses the cobalt-containing liquor which has been separated from the reaction products in the conventional manner in the oxo synthesis, regardless of whether it is in solution or suspension form. Previous methods for separating spent catalysts such as cobalt catalysts from the conventional reaction mixture include treatments of the reaction mixture with steam, mineral acids or organic acids thus to convert the cobalt to reduced metallic cobalt or cobalt salts and thus to obtain a crude suspension or solution liquor containing cobalt. In contrast to our direct use of this crude liquor in the rejuvenation step, prior methods involved subsequent chemical or physical treatments in a number of steps before the cobalt material could be converted into an active actalyst for re-use in the oxo or other process. In our process a catalytic amount of a noble metal, heretofore defined, is added to the crude liquor and the mixture treated as described with hydrogen-containing carbon monoxide gas, also as previously described.

The present invention presents an additional advantage in cobalt carbonyl regeneration in those cases where the spent catalyst liquor recovered from the reaction products of the conventional oxo reaction contains an additional metallic ion of Groups I or II of the Periodic Table. In such cases the spent catalyst liquor recovered by extraction from the cobalt-containing solution separated during the catalyst-removing step of the conventional oxo process can be used directly, and the catalyst rejuvenation can be carried out as a continuous process by using as feed to the regeneration or rejuvenation step the spent catalyst liquor slurried in an organic solvent.

The catalyst for the step of reacting the cobalt material, which may contain the second metal catalyst, with hydrogen-containing carbon monoxide gas, is a noble metal of the group consisting of palladium, platinum or gold, and said noble metal can be used in the form of the metal itself, alone or supported on carriers such as alumina, silica, activated clay, an oxide of chromium or titanium or carbon. Instead of the metal itself, it can be employed as an inorganic or organic salt. The amount of the noble metal used, when supported on a carrier, is preferably within the range of between 0.5 and 15 percent by weight of the composite catalyst plus carrier. The amount of noble metal catalyst employed, based on the quantity of cobalt and second metal lies preferably in the range of 0.001 to 0.2 mols of noble metal per mol of the composite of the cobalt plus second metal, all calculated on the basis of the the metals. The preferred range of noble metal to the latter composite is in the range of 0.01 to 0.1. The specific method of preparing the noble metal catalyst is known; for example see Organic Synthesis, Vol. 26, page 77.

The noble metal catalyst can be employed in the form of a fixed bed or any other conventional form, depending upon the other operating conditions and requirements which prevail. However, the troublesome regenerating treatments that characterize prior art noble metal catalysts is unnecessary, and this unexpected advantage makes possible a unitary operation, and the novel catalyst composite forming process can be carried out for prolonged periods of time, permitting recycling of spent catalyst, to great technological advantage.

As organic solvents useful for carrying out the catalyst formation or rejuvenation, we can use lower saturated hydrocarbons of six to eight carbon atoms such as $n$-hexane and $n$-heptane, aliphatic alcohols such as butanol and isooctanol, aldehydes and others, or the alcohol or ether by-products of the oxo process such as isooctanol, isobutanol or ethers, alone or as a separated mixture from the oxo process.

The temperature of the novel reaction can be carried out in the range of 50° and 200°C., especially 50° to 100°C. as a preferred range and in the range of 50 kg/cm$^2$ to 300 kg/cm$^2$ especially 50 to 200 kg/cm$^2$ as a preferred pressure range for the hydrogen-containing gas. As previously stated, the ratio of hydrogen to carbon monoxide in the gas can be in the range of 0.05 to 2.0 mols of hydrogen per mol of carbon monoxide. The preferred range is 0.2 to 1.5 mols of hydrogen per mol of carbon monoxide. Under these reaction conditions the final carbonyl product can be obtained in a yield of more than 90 percent within a reaction time of 5 to 120 minutes. The reaction can proceed sufficiently rapidly under the above conditions even in the presence of water, and the life of the catalyst is not shortened if it contains casual contaminants.

In the event the carbonylation reaction is accompanied by the formation of water, the water is conveniently separated by permitting the reaction mixture to come to a state of quiescence, as on standing, whereupon it separates into an organic solvent layer and an aqueous solution layer which can easily be separated.

In a typical embodiment of carrying out the novel process of this invention, a selected cobalt compound and a second metal compound selected from those effective as dimerization-dehydration catalysts are added to an organic solvent and the mixture allowed to react with carbon monoxide and hydrogen within the pressure and temperature ranges described above, in the presence of a palladium, platinum or gold catalyst. In a typical rejuvenation embodiment of this invention, the conventional oxo reaction product is subjected to the catalyst-removing treatment in the conventional manner as described above. The separated catalyst-containing liquor is then used as the starting material in the above process, using the same reaction agents and conditions. In this latter typical embodiment a water-removal treatment can be employed as described above.

A variation of the present invention comprises a continuous flow system where the noble metal catalyst (i.e., palladium, platinum or gold) suitably supported on a carrier is packed as a fixed bed in a reaction tower. An organic solvent layer is maintained above the bed and an aqueous solution layer maintained below it. The flow of these two solvents to and from the reaction zone is regulated so as to maintain the metal (cobalt and second metal of Group I or Group II) concentration in each level at a constant value while maintaining the reaction conditions previously described.

DETAILED DESCRIPTION OF THE INVENTION

Example 1

Into a 500 ml magnetically stirred autoclave were placed cobalt oleate (2.96 g. as cobalt), zinc oleate (2.05 g. as zinc), isobutanol (as solvent, 180 ml.) and palladium-active carbon (0.15 g. as palladium, employed as catalyst, 5 percent by weight of metal palladium supported on active carbon with a grain size of 100-300 mesh). Synthesis gas ($H_2/CO = 1.33$) was fed into the autoclave under an initial pressure of 150 kg/cm$^2$. The mixture was heated with stirring so that the temperature increased at a rate of 4°C./minute. The reaction started as soon as the temperature reached 100°C. The reaction mixture was then maintained at 105°C. for 30 minutes, and allowed to cool. The contents were analysed by the carbonyl analysis procedure (the procedure described in Analytical Chemistry, 24, 174 (1952) and it was found that there was 94.6 percent yield of cobalt carbonyl.

In carrying out the same treatment but without adding the above-mentioned palladium-active carbon catalyst, the reaction did not start at 100°C. and a pressure depression took place at 175°C. A reaction time of more than 60 minutes was required to obtain the same yield as described thereinbefore, and metal was separated on the inner wall of the reaction vessel.

Example 2

Into a 500 ml. magnetically stirred autoclave was placed 82.9 g. of a hydroxide slurry (water content: 19.9 percent by weight) prepared from cobalt hydroxide (2.93 g. as cobalt) and zinc hydroxide (2.05 g. as zinc) in isooctanol, and the palladium-active carbon catalyst employed in Example 1 (0.15 g. as palladium) was added. Synthesis gas ($H_2/CO = 1.33$) was then charged to a pressure of 150 kg/cm$^2$, and the mixture was heated. The reaction started at 96°C. The reaction mixture was then maintained at 100°C. for 60 minutes. The analysis of the contents by the procedure described in Example 1, showed that the yield of carbonyl was 93.4 percent, and the distribution ratio was 95 percent in the organic solvent layer and 5 percent in the aqueous solution layer, respectively.

Example 3

In carrying out the reaction under the same conditions as described in Example 1 except that platinum-carbon (0.23 g. as platinum, 5 percent by weight of platinum supported with active carbon having a grain size of 100-300 mesh) was employed as a catalyst, the reaction started at 134°C. Therefore, the reaction mixture was then maintained at 140°C. for 60 minutes. After being cooled, the contents were analysed and a 98.0 percent yield of carbonyl was obtained.

Example 4

In carrying out the reaction under the same conditions as described in Example 1 except that gold-carbon (0.22 g. as gold, 4.8 percent by weight of gold supported with active carbon having a grain size of 100-300 mesh) was employed as a catalyst, the reaction started at 131°C. Therefore, the reaction mixture was then maintained at 135°C. for 60 minutes. After being cooled, the contents were analysed and a 97.0 percent yield of carbonyl was obtained.

Example 5

The cobalt-zinc carbonyl compound synthesized in Example 1 was subjected to the oxo process and dimerization-dehydration reaction. Propylene (as olefin, 40.5 g.), recycled oxo reaction product (as solvent, 180 ml.) and the above-mentioned carbonyl compound (0.3 percent by weight as cobalt and 0.2 percent by weight as zinc based on the amount of propylene) were placed in an autoclave into which 200 kg/cm$^2$ of synthesis gas ($H_2/CO = 1.33$) was charged. The mixture was heated at a rate to effect a temperature increase at a rate of 0.8°C./minute. After the reaction had been initiated at 150°C., the mixture was kept as it was for 60 minutes. The reaction rate of propylene reached 97.3 mol percent even at as low a temperature as 150°C.

For the sake of comparison, the conditions were maintained at 150°C. (the reaction initiating temperature in the above case) for 60 minutes employing cobalt and zinc oleates instead of employing the carbonyl compound according to the present invention. However, the reaction did not take place.

Example 6

Into a 500 ml. autoclave provided with an electromagnetic stirrer were charged 100 ml. of cobalt containing liquor (concentration of cobalt: 1.5 percent by weight) obtained from the oxo-reaction product after the catalyst removing procedure, 0.075 g. of palladium-bearing carbon carrier (calculated as palladium) prepared in the manner shown below, and 170 ml. of the organic solvent indicated in the following. The mixture was then contacted with synthesis gas ($H_2/CO = 1.33$) at an initial pressure of 150 kg/cm$^2$ with stirring. The content of the autoclave was then heated at a rate to effect a temperature rise of 0.8°C. per min., whereby the carbonylation reaction was initiated at the initiating temperatures as shown respectively in the table, and then the reaction mixture was kept at the same temperature for 60 min. After cooling, the contents of the reaction vessel were taken out and the yield of the cobalt carbonyl complex in both organic and aqueous layers was determined according to a method of analysis for carbonyl (cf: O. I. Wender: Anal. Chem., 24172 (1952)). The results are indicated in the following table.

| Organic solvent | Initiation temp. (°C.) | Carbonyl yield (%) | | |
|---|---|---|---|---|
| | | Organic layer | Aqueous layer | Total |
| n-Hexane | 148 | 33.2 | 25.7 | 58.9 |
| Isobutanol | 70 | 47.5 | 2.0 | 49.5 |
| Isooctanol | 85 | 39.6 | 10.7 | 50.3 |

Example 7

100 ml. of cobalt bearing liquors (concentration of cobalt, 1.5 percent; magnesium or zinc, 1.0 percent by weight) separated from the reaction products of the "oxo" synthesis in which carbonylation and dimerization-dehydration reactions were carried out simultaneously in the presence of a cobalt catalyst and a magnesium or zinc catalyst, respectively, 0.075 g. of the palladium-on-carbon catalyst (calculated as palladium) described in Example 1, and 170 ml. of isobutanol were placed in an autoclave, to which was introduced synthesis gas ($H_2/CO = 1.33$) under an initial pressure of 150 kg/cm$^2$. The reaction mixture was heated at a rate of temperature rise of 0.8°C. per minute, whereby the reaction was initiated at the initiation temperatures as shown in the following table, the temperatures were maintained further for 60 minutes to completion of the carbonylation reaction. The results obtained are shown in the following table.

| Metal in dimerization-dehydration catalyst | Initiation temp. °C. | Carbonyl yield (%) | | |
|---|---|---|---|---|
| | | Organic layer | Aqueous layer | Total |
| Magnesium | 90 | 84.3 | 3.9 | 88.2 |
| Zinc | 90 | 60.8 | 2.5 | 63.3 |

Example 8

The carbonylation reaction was carried out in the same manner as described in Example 1, except that 0.14 g. of platinum-on-carbon catalyst was used instead of palladium-on-carbon catalyst. Isobutanol was used as the solvent in this case, and the reaction was initiated at 105°C., which resulted in the carbonyl yield in the organic layer of 36.9 wt. percent, carbonyl yield in aqueous layer of 3.2 wt. percent and total carbonyl yield of 40.1 wt. percent.

Example 9

In this example, the carbonylation reaction was carried our using a solution containing zinc in addition to cobalt in the same manner as described in Example 2 except that 0.14 g. of platinum-on-carbon catalyst was used instead of palladium catalyst. Isobutanol was used as the solvent. The reaction was initiated at 135°C., and the results were: carbonyl yield in the organic layer, 74.8 wt. percent; carbonyl yield in the aqueous layer, 3.5 wt. percent, total carbonyl yield 78.3 wt. percent.

Example 10

Example 1 was repeated by adding the same palladium-active carbon catalyst but using hydrogen-containing carbon monoxide gas of $H_2/CO = 0.6$ instead of the gas of $H_2/CO = 1.33$.

In this case, the reaction started as soon as the temperature reached 110°C., and the reaction mixture was then maintained at 115°C. for 30 minutes and allowed to cool. 95 percent yield of carbonyl was obtained according to the analysis of the product.

Example 11

Example 1 was repeated by adding the same palladium-active carbon catalyst but using a hydrogen-containing carbon monoxide gas of $H_2/CO = 0.3$. In this case, the reaction started as soon as the temperature reached 120°C., and the reaction mixture was then maintained at 125°C. for 30 minutes and allowed to cool. 95.0 percent yield of carbonyl was obtained according to the analysis of the product.

The embodiments of the invention in which an exclusive property or privilege is claimed are defined as follows:

1. A process for synthesizing a catalyst composition, which comprises reacting in an inert organic liquid medium reactants consisting essentially of (A) a mixture consisting essentially of (1) a cobalt material selected from the group consisting of cobalt metal, cobalt hydroxide and inorganic and organic salts of cobalt and (2) second metal material selected from the group consisting of a metal of Groups IA, IIA and IIB of the Periodic Table, the hydroxide of said second metal and inorganic and organic salts of said second metal, in which the ratio of cobalt to said second metal is in the range of 0.5 to 5.0 to 1 parts by weight, and (B) a hydrogen-containing carbon monoxide gas having a ratio of hydrogen to carbon monoxide in the range of 0.05 to 2.0 mols of hydrogen per mol of carbon monoxide, in the presence of a noble metal selected from the group consisting of palladium, platinum and gold, at a pressure in the range of 50 to 300 kg/cm$^2$, at a temperature in the range of 50° to 200°C, to obtain a liquid reaction product containing cobalt carbonyl and second metal derived from said second metal material, as catalyst constituents.

2. The process of claim 1 in which the molar ratio of hydrogen to carbon monoxide is 0.2 to 1.5:1.

3. The process of claim 1 in which the second metal of (2) is zinc, used in the form of its salt.

4. The process of claim 1 in which the noble metal is palladium.

5. The process of claim 1 in which the pressure is between 50 and 200 kg/cm$^2$ and the temperature is in the range of 50° to 100°C.

6. A process for rejuvenating a used oxo reaction catalyst consisting essentially of cobalt carbonyl and second metal selected from the group consisting of a metal of Groups IA, IIA and IIB of the Periodic Table, in which the ratio of cobalt to said second metal is in the range of 0.5 to 5.0 to 1 parts by weight, which comprises separating from the reaction product of an oxo synthesis the liquor containing said used oxo reaction catalyst, reacting said liquor in an inert organic liquid medium with a hydrogen-containing carbon monoxide gas having a ratio of hydrogen to carbon monoxide in the range of 0.05 to 2.0 mols of hydrogen per mol of carbon monoxide, in the presence of a noble metal selected from the group consisting of palladium, platinum and gold, at a pressure in the range of 50 to 300 kg/cm$^2$, at a temperature in the range of 50° to 200°C, to obtain a liquid reaction product containing cobalt carbonyl and said second metal as catalyst constituents.

7. The process of claim 6 in which the ratio of hydrogen to carbon monoxide is 0.2 to 1.5:1.

8. The method of claim 1 in which the metals used are cobalt oleate and zinc oleate.

9. The process of claim 1 in which the metals used are cobalt and zinc used in the form of their hydroxides.

10. The process of claim 1 carried out in a reaction tower having the noble metal in the form of a fixed bed catalyst and in which the zone above the bed is maintained as an organic solvent zone and the zone below the bed as an aqueous solvent zone, feeding the second metal material to be reacted to the bed by means of the aqueous layer and withdrawing the liquid reaction product from the reaction zone by means of organic solvent layer.

* * * * *

UNITED STATES PATENT OFFICE
CERTIFICATE OF CORRECTION

Patent No. 3,816,337      Dated June 11, 1974

Inventor(s) Seiji Usami, Kotaro Nishimura and Saburo Fukushi

It is certified that error appears in the above-identified patent and that said Letters Patent are hereby corrected as shown below:

In the heading, insert:

---Foreign Application Priority Data

July 8, 1967   Japan .......... 43922/1967 ---.

Signed and sealed this 15th day of October 1974.

(SEAL)
Attest:

McCOY M. GIBSON JR.
Attesting Officer

C. MARSHALL DANN
Commissioner of Patents